L. E. CARPENTER.
CHEESE.
APPLICATION FILED MAR. 30, 1915.
1,163,066.
Patented Dec. 7, 1915.
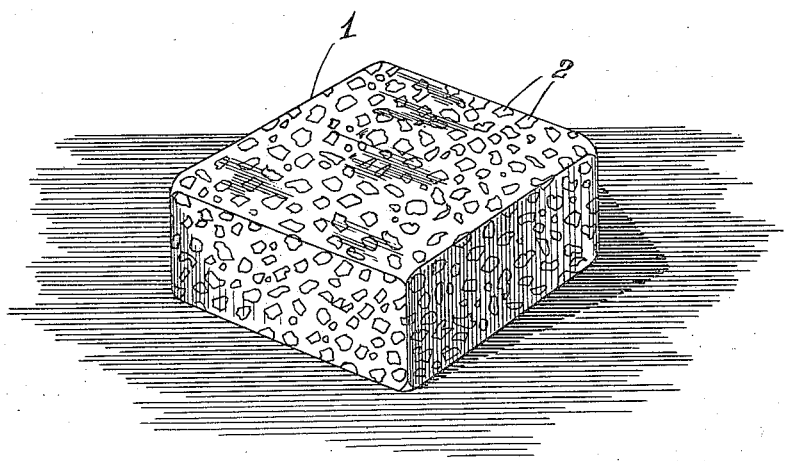
Witnesses:
Fred. Rogers.
Matthew Monahan
Inventor
Linn E. Carpenter.
By his Attorney
Walton Harrison

UNITED STATES PATENT OFFICE.

LINN EUGENE CARPENTER, OF EAST ORANGE, NEW JERSEY.

CHEESE.

1,163,066.  Specification of Letters Patent.  Patented Dec. 7, 1915.

Application filed March 30, 1915. Serial No. 18,016.

*To all whom it may concern:*

Be it known that I, LINN EUGENE CARPENTER, a citizen of the United States, residing at East Orange, in the county of Essex and State of New Jersey, have invented certain new and useful Improvements in Cheeses, of which the following is a specification.

My invention relates to cheeses, and among the objects I seek to accomplish are the following: I. To give the cheese an improved taste and a distinctive flavor. II. To prevent, or at least retard, the decomposition of the cheese—especially in instances where the cheese is soft or has an unstable composition such as ordinarily invites rapid decay. III. To confer upon the cheese a heterogeneous texture, so as to prevent it from becoming pasty. IV. To give the cheese a distinctive and attractive appearance.

I begin with a cheese body, which may itself be a finished cheese. I prefer to use a so-called soft cheese, because of the richness of its flavor. Cream cheese answers the purpose admirably. Cream cheese, as its name implies, is made from materials containing an excess of cream, and because of this fact is not only soft but unstable. Under ordinary conditions, it does not stay fresh very long, especially in warm weather. The decomposition of cheese of this kind is perhaps not properly designated as putrefaction. Even after undergoing partial decomposition the cheese is still edible, but owing to the gradual accumulation of various organic acids within the cheese body the taste of the latter is greatly impaired, and the flavor is no longer uniform for cheeses of the same kind or even for different parts of an individual cheese. Again, the partial decomposition tends to separate the liquid from the solid portions, and to cause the evolution of odoriferous gases. The taste of lactic acid begins to predominate, and gives the cheese a sour taste. While lactic acid is itself healthy, the sour taste due to its formation under conditions here contemplated is objectionable.

What I seek to do, therefore, is to distribute throughout the cheese body a comminuted, edible, organic material capable of not only acting as a preservative of the cheese, but also of conferring upon the latter an agreeable flavor, thus overcoming the flavor of badly-tasting acids therein contained. For this purpose I use ordinary preserved cherries, which I cut or comminute into little bits and work into or mix with the cheese body, and so distribute with approximate uniformity throughout the mass thereof.

Reference is made to the accompanying drawing forming a part of this specification, and in which like letters indicate like parts, the figure being a perspective of a bar of cheese made in accordance with my invention.

The body appears at 1, and at 2 are shown the bits or pieces of cherries, which are distributed throughout the mass or substance of the bar, as nearly uniform as practicable. The particular specimen here shown is a so-called package cheese; that is, a flat bar or small brick-like member adapted to be wrapped in tin foil or otherwise protected until ready for immediate use. My improved cheese, however, can be put up in any other form desired.

As a typical illustration, I will use cream cheese. This is soft, as above indicated. To each ninety pounds of the cheese body I use ten pounds of ordinary preserved cherries, such for instance as are usually sold as bottled cherries. These are so commonly known as to need no description. As originally prepared they are seeded, and then with about ten per cent. by weight of sugar they are cooked, after which they are bottled. I take these preserved cherries, run them through a sausage grinder and thus cut them into bits, and then mix these bits with the cream cheese. The entire mass is now worked up, and next passed between rollers and finally cut or molded into bars or bricks, as shown in the drawing.

The completed bar of cheese contains by weight about ten per cent. of the comminuted cherries, about one per cent. of the entire mass or ten per cent. of the contained cherries being sugar.

In the cheese thus prepared the flavor is very pleasant, as the taste of the cheese body blends harmoniously with the taste of both the sugar and the cherries. The cherries have antiseptic properties, and this is also true of the sugar. Hence, the cherries thus used have a tendency to preserve the cheese body. By actual trial I have found that the comminuted cherries preserve the entire mass of the cheese body, though not in actual contact with the mass at every point therein.

Each bit or portion of cherry appears to have a tendency to preserve portions of the cheese body close to it, though not resting directly against it. In other words, each bit of cherry tends to preserve all the material contained in a miniature zone of larger size than the bit of cherry.

I find that a cheese, treated as above described, will last twice as long, before undergoing a given degree of decomposition, as if not so treated.

Because of the heterogeneous character of the finished article, it is not pasty and can not readily become so. It retains all the richness of flavor peculiar to a cream cheese or other soft cheese, and it has a marked tendency to maintain its original consistency and its general appearance unchanged for a relatively long period of time.

I claim:—

1. A cheese, comprising a cheese body having its mass interspersed throughout with comminuted cherries.

2. A cheese comprising a soft cheese body having its mass interspersed with comminuted cherries.

3. A cheese comprising a body of cream cheese having its mass interspersed with comminuted cherries.

4. A cheese comprising a cheese matrix interspersed with distinct bodies of appreciable size, each of said bodies consisting of a vegetable substance sweetened with a flavoring material.

5. A cheese body comprising a matrix of cream cheese interspersed with distinct bodies of readily noticeable size, each of said bodies consisting of a vegetable substance sweetened with sugar.

6. A cheese comprising a cheese body flavored with preserved cherries.

7. A cheese comprising a cream cheese body containing cherries.

8. A cheese comprising a cream cheese body interspersed with comminuted cherries preserved in sugar.

9. A cheese comprising a cream cheese body interspersed with comminuted cherries preserved in sugar, in the proximate portion of nine parts of said cheese body to one part of said cherries, by weight.

10. A cheese, comprising a cheese body interspersed throughout with comminuted cherries preserved in sugar, the proximate proportions, by weight, being one part of sugar, nine parts of cherries and ninety parts of said cheese body.

Signed in the presence of two subscribing witnesses.

LINN EUGENE CARPENTER.

Witnesses:
J. F. WHITNEY,
L. E. BUCKBEE.